US009526368B2

(12) United States Patent
Sacks

(10) Patent No.: US 9,526,368 B2
(45) Date of Patent: Dec. 27, 2016

(54) SINGLE CUP COFFEE AND TEA BREWING SYSTEM

(71) Applicant: Jerome E Sacks, Lexington, MA (US)

(72) Inventor: Jerome E Sacks, Lexington, MA (US)

( * ) Notice: Subject to any disclaimer, the term of this patent is extended or adjusted under 35 U.S.C. 154(b) by 0 days.

(21) Appl. No.: 14/542,566

(22) Filed: Nov. 15, 2014

(65) Prior Publication Data

US 2016/0135639 A1  May 19, 2016

Related U.S. Application Data

(60) Provisional application No. 62/015,462, filed on Jun. 22, 2014, provisional application No. 62/024,550, filed on Jul. 15, 2014, provisional application No. 62/036,164, filed on Aug. 12, 2014.

(51) Int. Cl.
*A47J 31/06* (2006.01)
*A47J 31/02* (2006.01)

(52) U.S. Cl.
CPC ............. *A47J 31/02* (2013.01); *A47J 31/0605* (2013.01); *A47J 31/0621* (2013.01); *A47J 31/0636* (2013.01)

(58) Field of Classification Search
CPC . A47J 31/0605; A47J 31/0621; A47J 31/0636
USPC .................. 99/299, 304, 305, 306, 322, 321
See application file for complete search history.

(56) References Cited

U.S. PATENT DOCUMENTS 2,951,431 A * 9/1960 Hugentobler ................... 99/299
3,484,245 A * 12/1969 Jyunichi ....................... 426/397
4,033,248 A * 7/1977 DiSalino ......................... 99/281
4,343,232 A * 8/1982 Corbier ........................... 99/299
5,085,135 A 2/1992 Collignon
6,327,965 B1 12/2001 Lin Tien
6,494,128 B1 12/2002 Yu
D569,685 S 5/2008 Liu
D578,348 S 10/2008 Liu
(Continued)

FOREIGN PATENT DOCUMENTS

FR  1214557  * 4/1960  .......... A47J 31/0605

OTHER PUBLICATIONS

New Clever Coffee Brewer http://www.amazon.com/Abid-New-Clever-Coffee-Dripper/dp/B008LXDSE8/ref=sr_1_2?s=home-garden&ie=UTF8&qid=1412780762&sr=1-2&keywords=Clever+Coffee+Brewe.

(Continued)

*Primary Examiner* — Reginald L Alexander
(74) *Attorney, Agent, or Firm* — Jerome E. Sacks, Patent Agent

(57) ABSTRACT

The first embodiment of the disclosure presents a single cup coffee brewer comprised of two components: a dripper component and a drip rate control component. The dripper component has a brewing container with a flat bottom having a drainage part, and a cylindrical tube member that fits inside the brewing container. A single sheet of Number 4 filter paper is wrapped around the cylindrical tube member, fitting snugly against the drainage part, thereby forming a dripper having a flat bottom using standard filter paper.

The drip rate control component is attached to the dripper component, and has a lever that controls the drip control rate from zero to a maximum value. The coffee brewer can therefore be used as a dripper with a user controlled drip rate, or as an infuser followed by a dripper where the user controls the drip rate.

6 Claims, 10 Drawing Sheets

(56) References Cited

U.S. PATENT DOCUMENTS

| | | |
|---|---|---|
| 7,849,784 B2 | 12/2010 | Adler |
| 8,033,212 B2 | 10/2011 | Liu |
| 8,479,644 B2 | 7/2013 | Liu |
| 8,485,089 B2 | 7/2013 | Taylor et al. |
| 8,635,946 B2 * | 1/2014 | White et al. .................... 99/299 |
| 9,055,836 B2 | 6/2015 | Liu |
| 9,060,649 B2 | 6/2015 | Sproul et al. |
| 2011/0175001 A1 | 7/2011 | Liu |

OTHER PUBLICATIONS

Incred 'a Brew http://www.amazon.com/IAB109-Incred-Brew-Direct-Immersion-Brewing/dp/B00935GWRS/ref=sr_1_1?s=home-garden&ie=UTF8&qid=1412780658&sr=1-1&keywords=incred+%27a+Brew.

AeroPress http://www.amazon.com/Aeropress-Coffee-and-Espresso-Maker/dp/B0047BIWSK/ref=sr_1_1?s=home-garden&ie=UTF8&qid=1412780613&sr=1-1&keywords=aeropress.

Bonavita BV4000ID Porcelain Immersion Coffee Brewer http://www.amazon.com/Bonavita-Wide-Porcelain-Immersion-Dripper/dp/B00MFJX7P4/ref=sr_1_fkmr0_2?s=home-garden&ie=UTF8& qid=14.

* cited by examiner

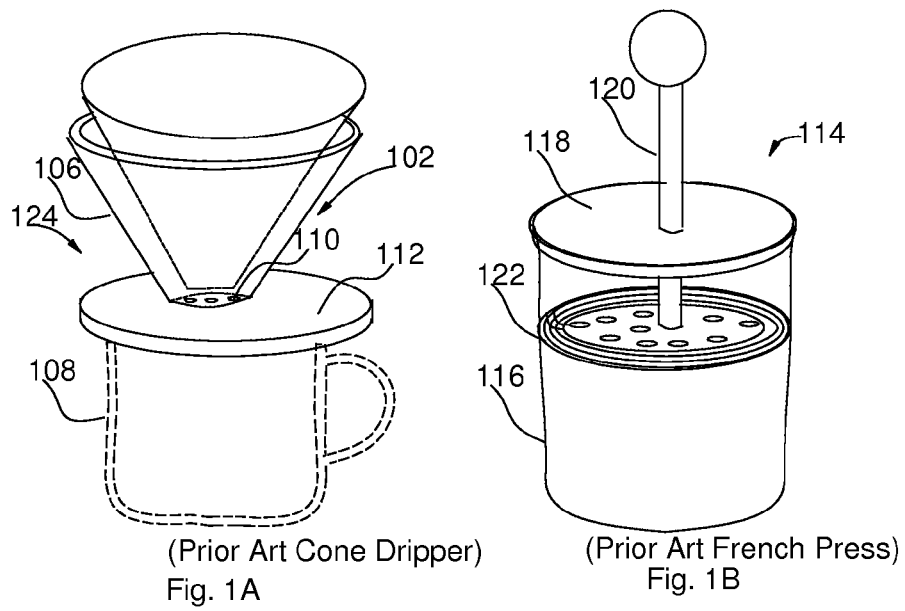
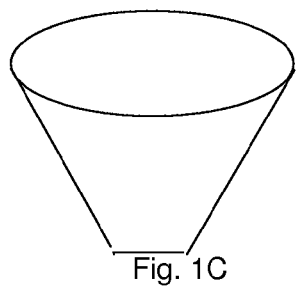
Fig. 1C
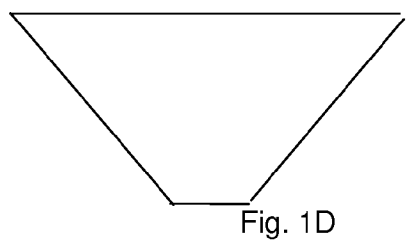
Fig. 1D
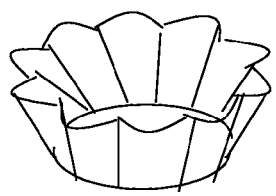
Fig. 1E
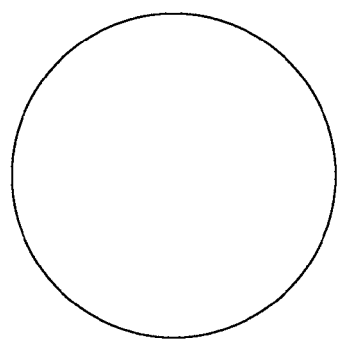
Fig. 1F
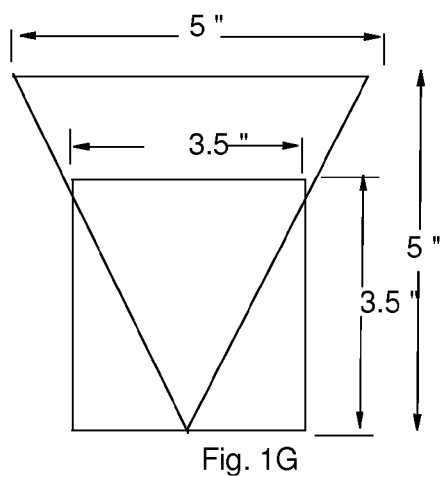
Fig. 1G

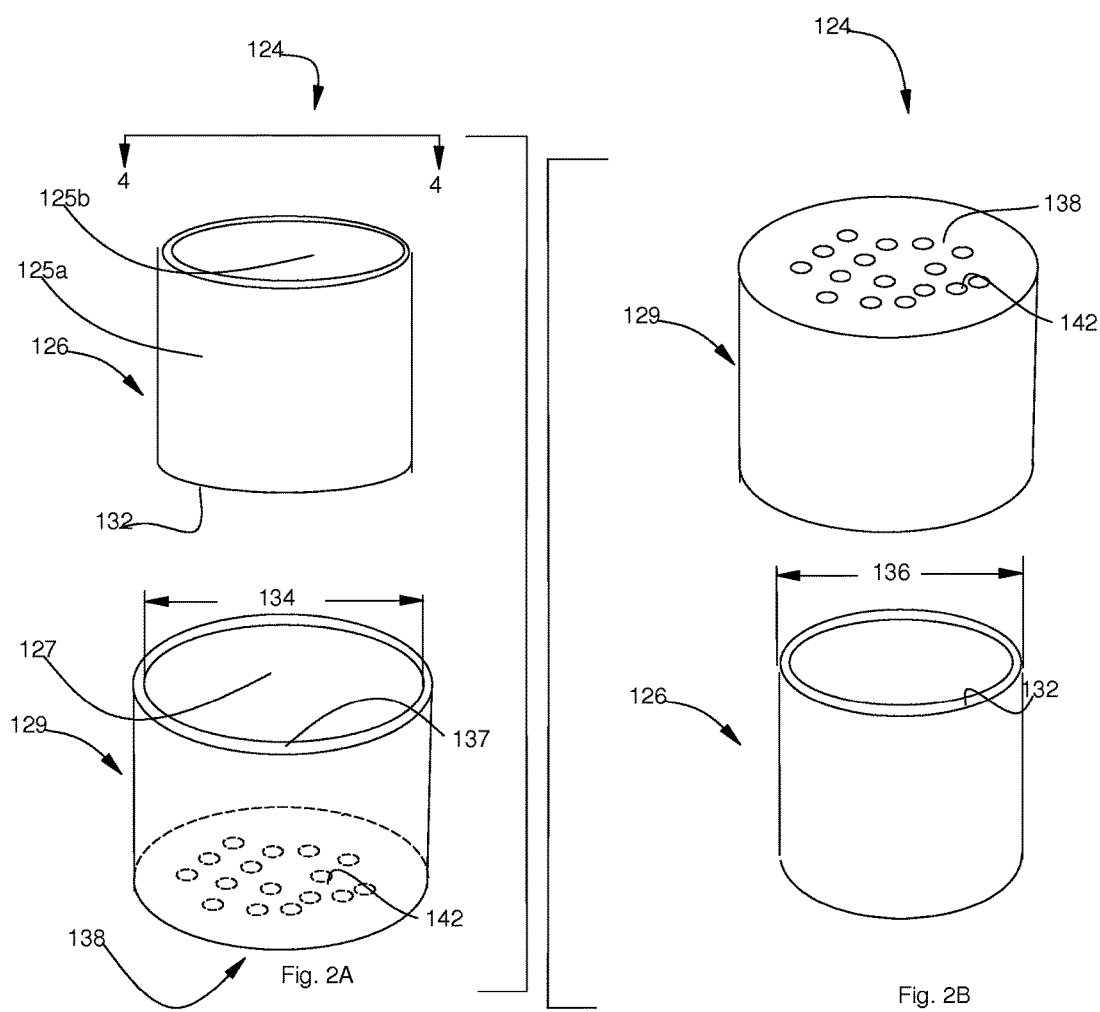

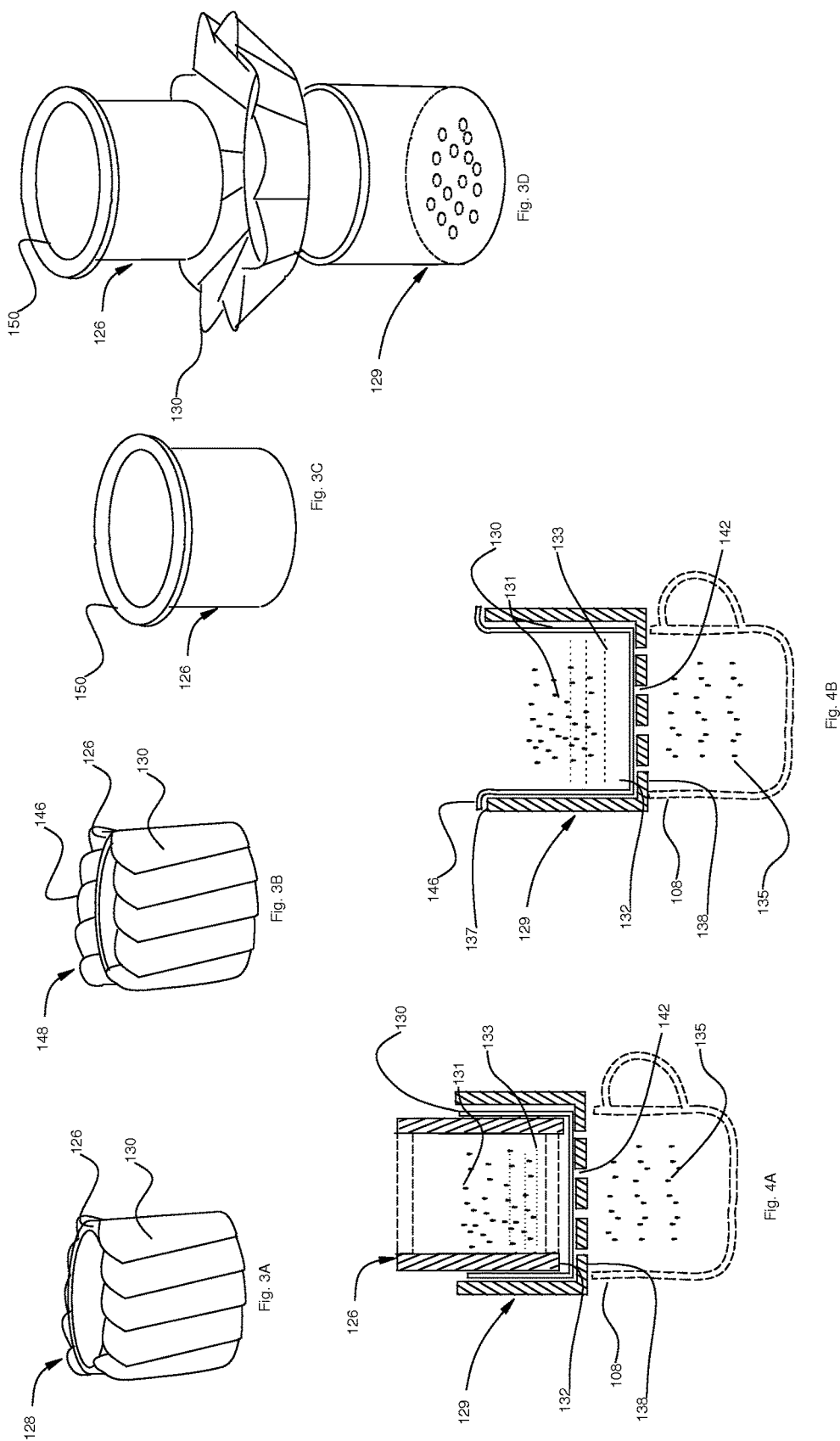

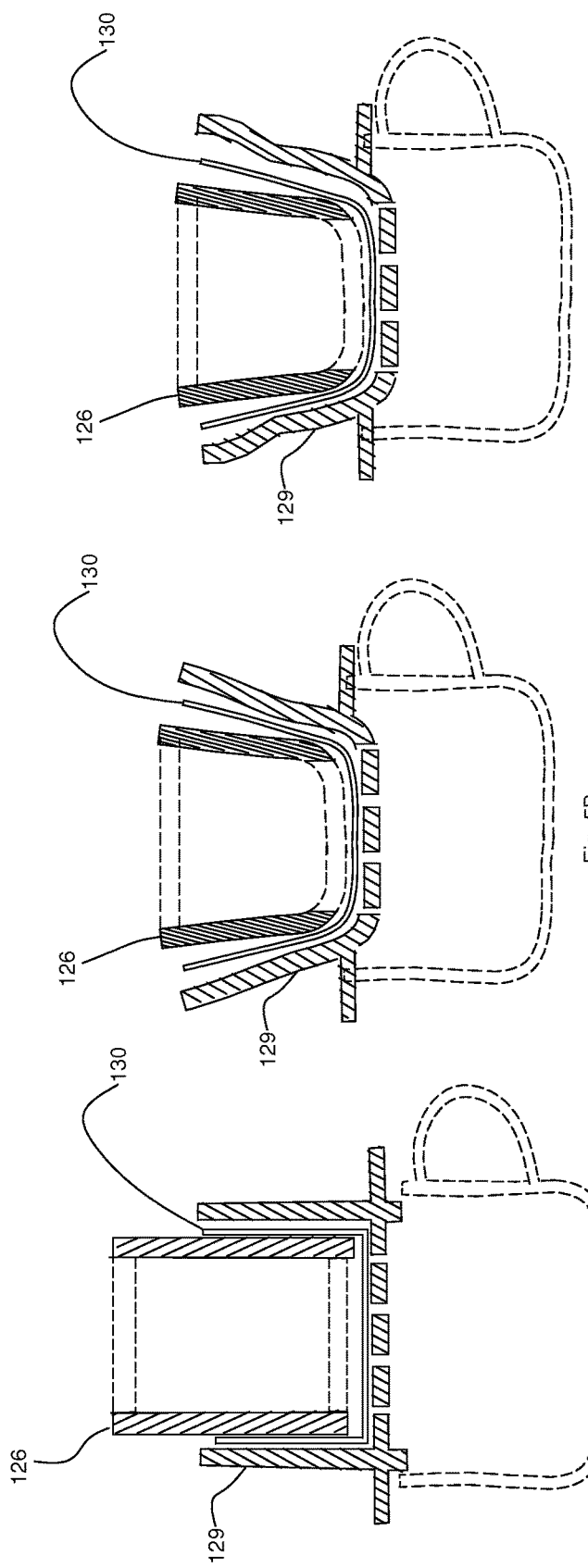

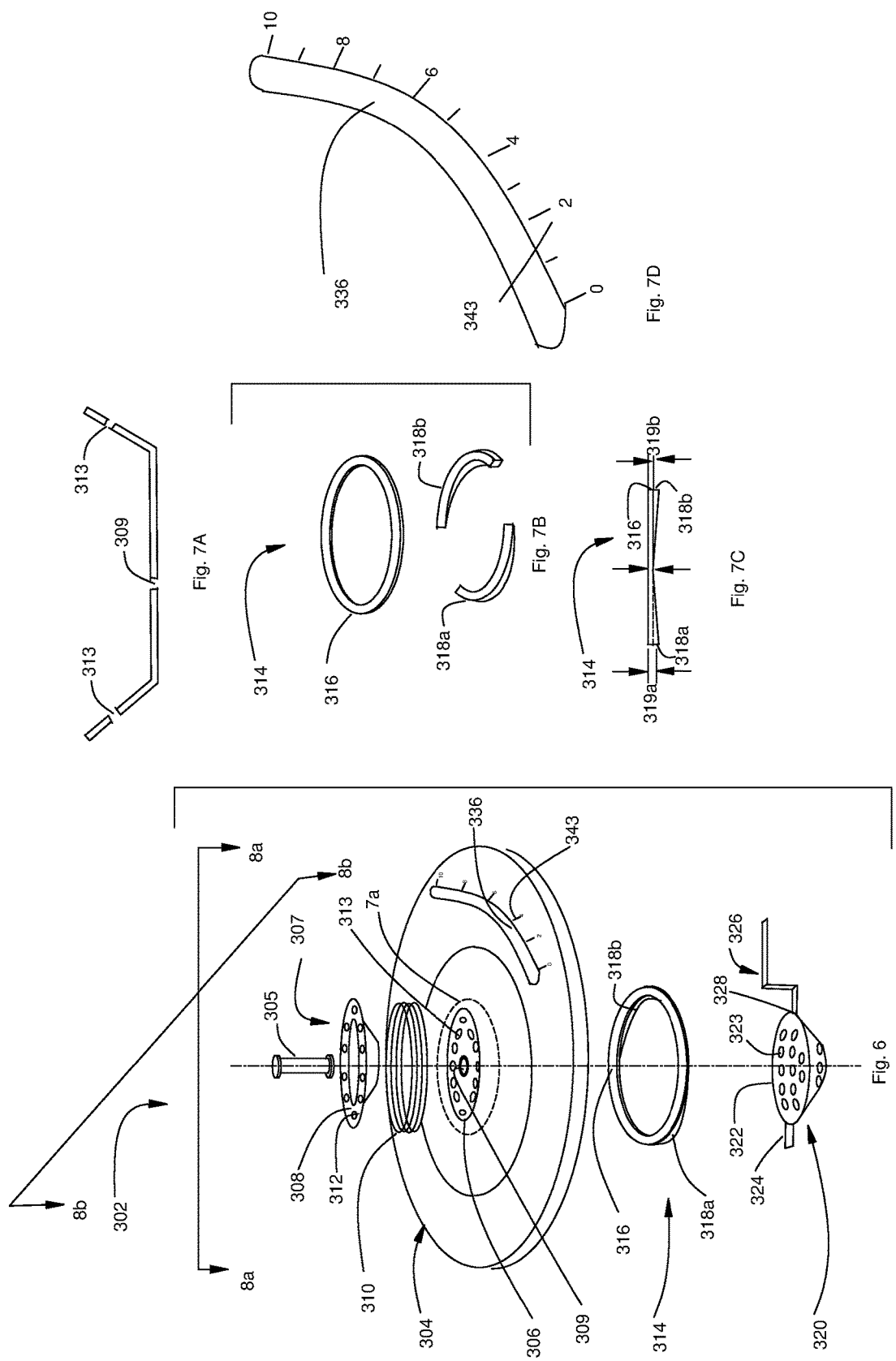

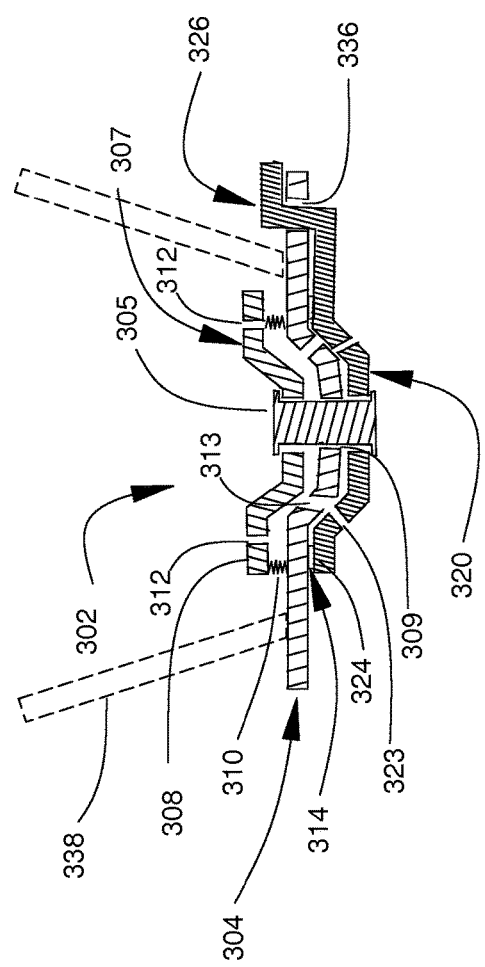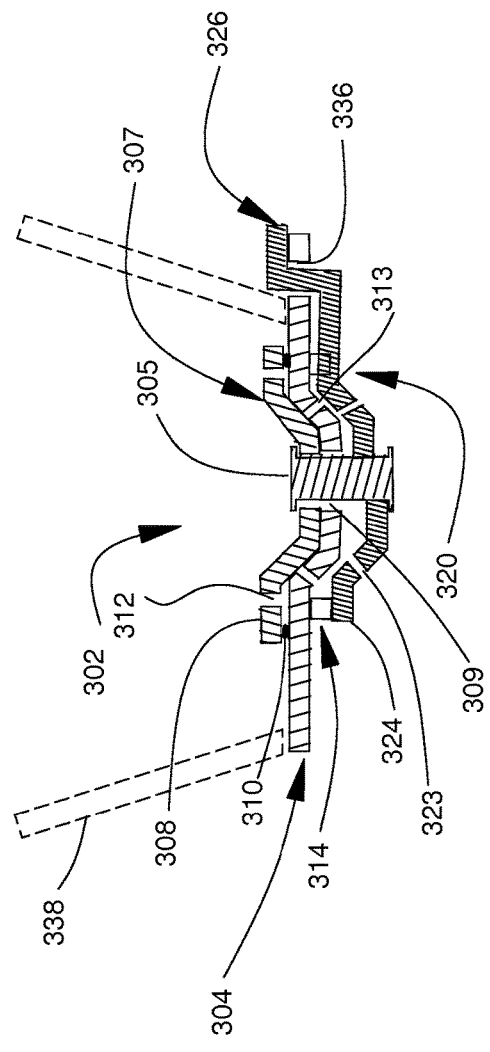

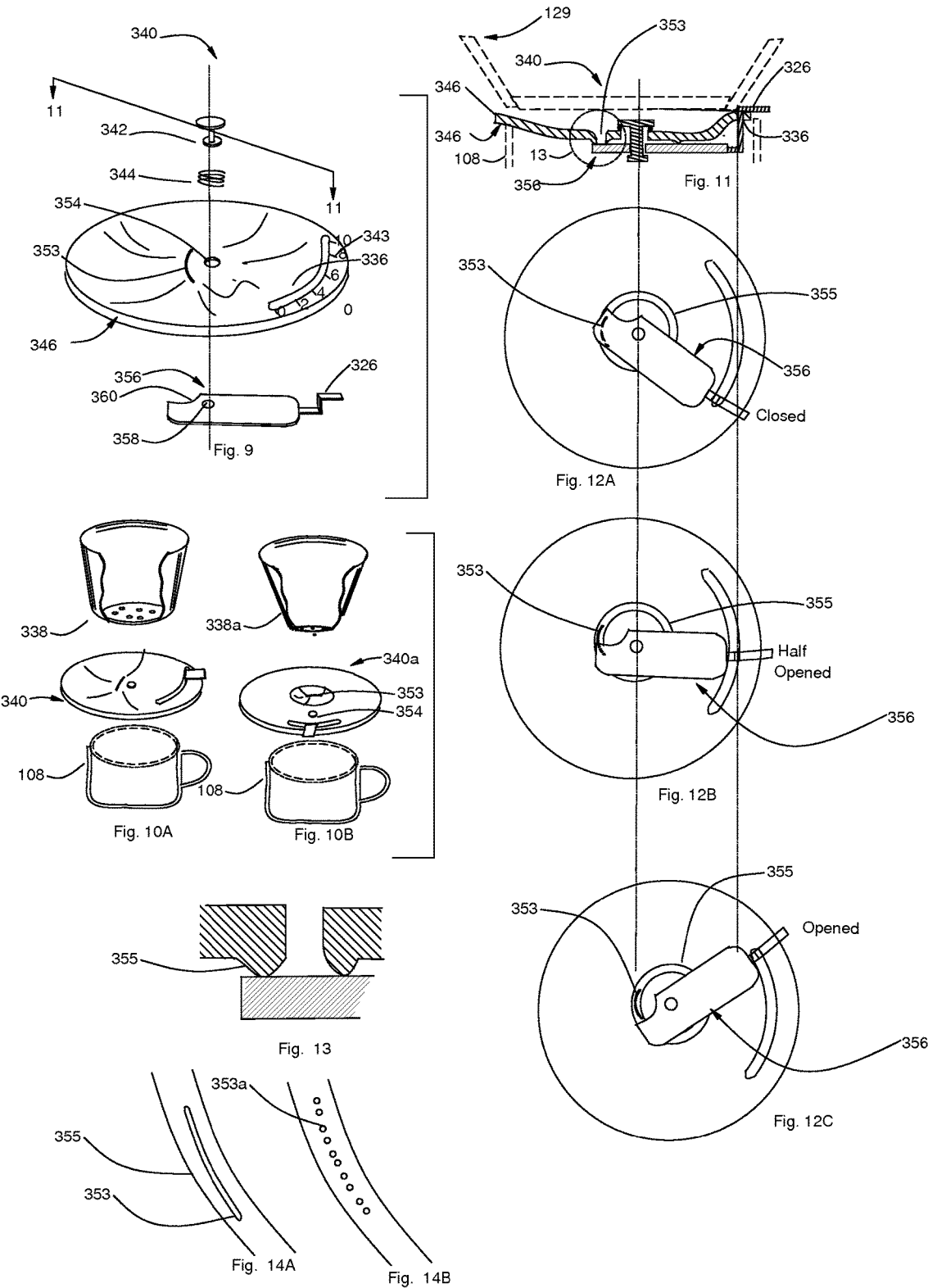

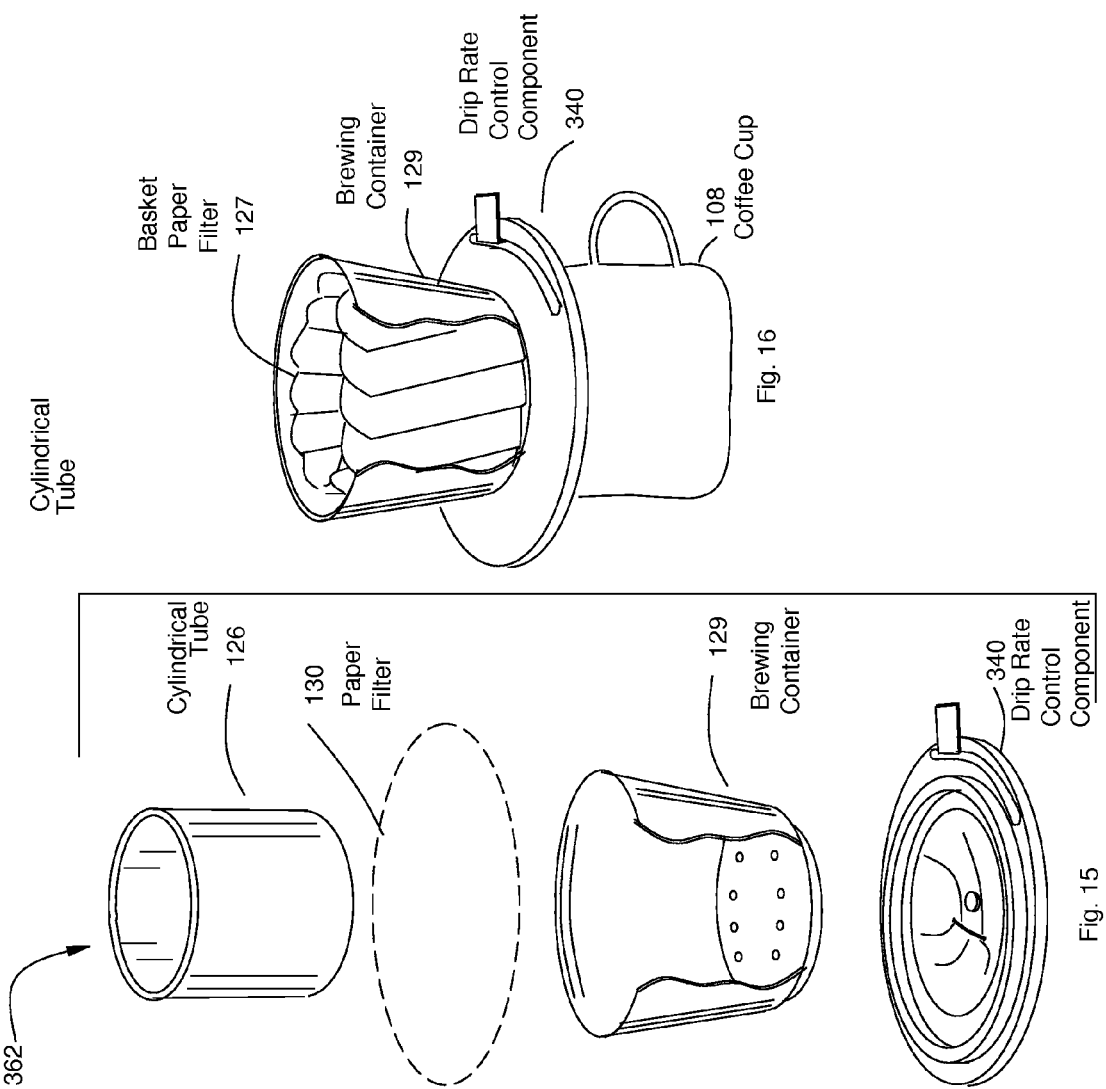

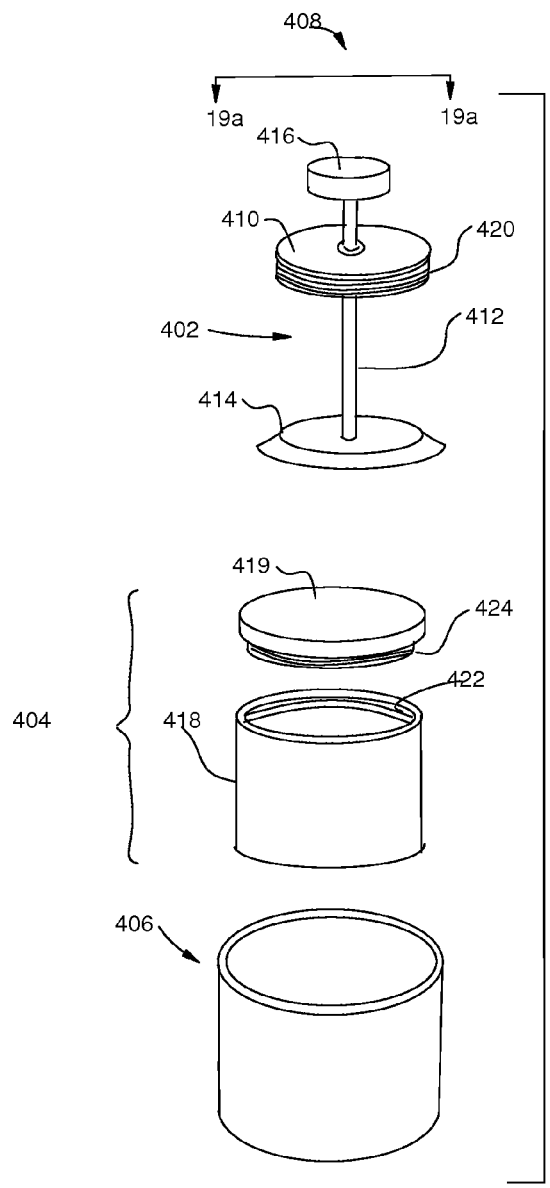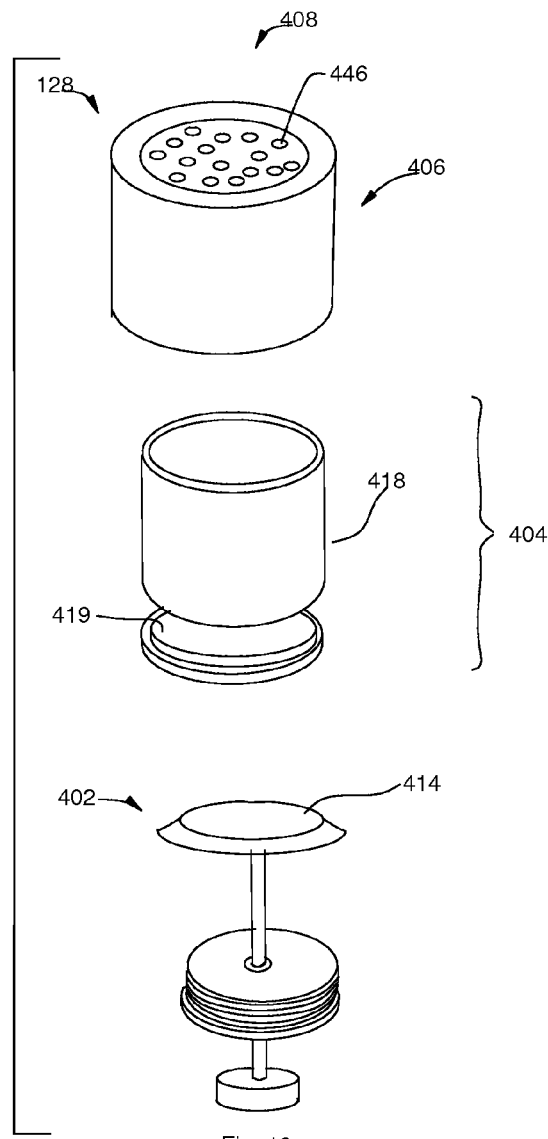
Fig. 17
Fig. 18
Alternate Embodiment

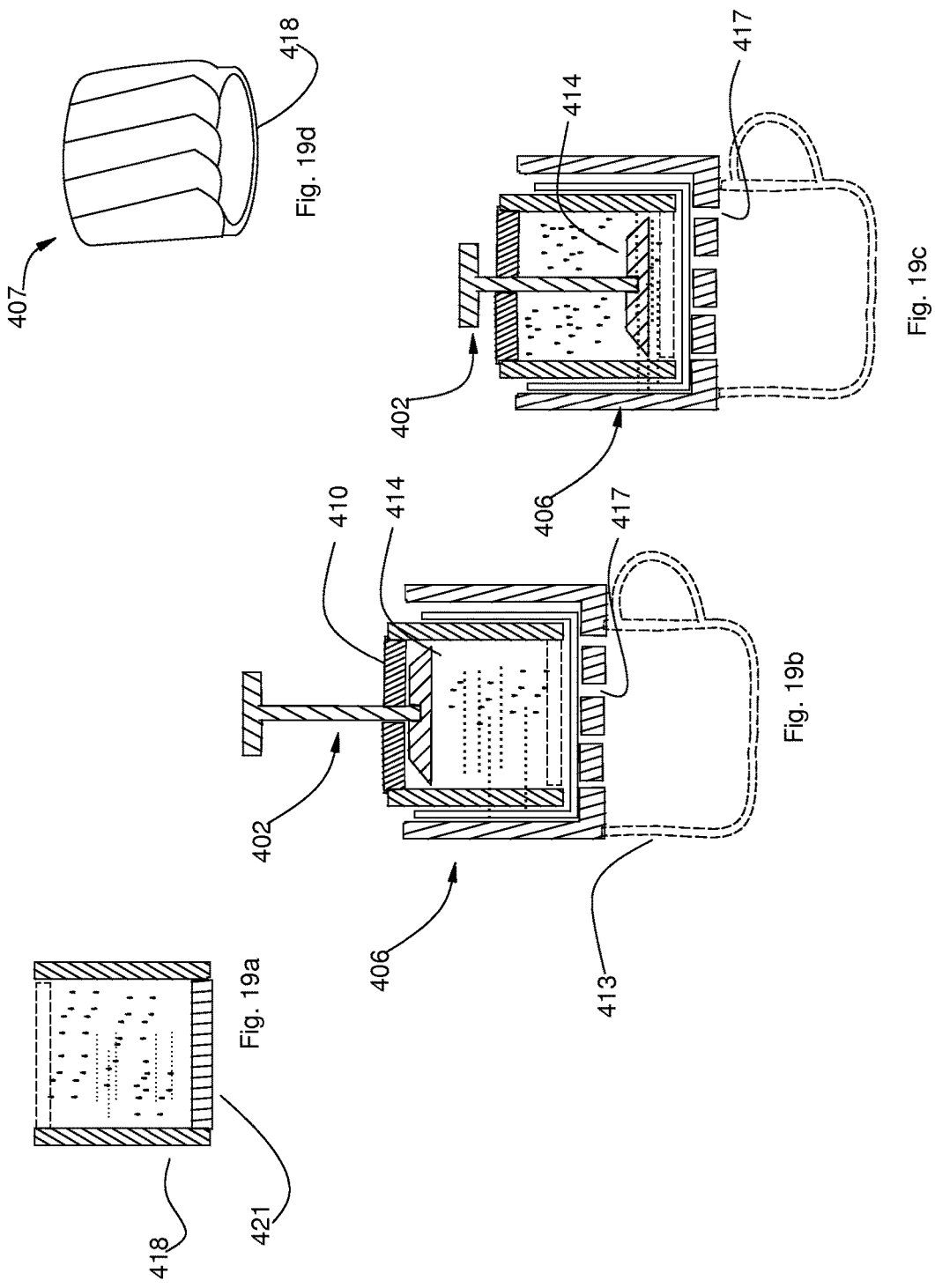

SINGLE CUP COFFEE AND TEA BREWING SYSTEM

CROSS-REFERENCE TO RELATED APPLICATIONS

This application claims the benefit of the U.S. Provisional Patent Application No. 62/015,462 filed Jun. 22, 2014 by the present inventor. This application also claims the benefit of the U.S. Provisional Patent Application No. 62/024,550 filed Jul. 15, 2014 by the present inventor. This application also claims the benefit of the U.S. Provisional Patent Application No. 62/036,164 filed Aug. 12, 2014 by the present inventor. These provisional patent applications are incorporated herein by reference.

BACKGROUND

There are two basic generic types of single cup coffee and tea brewers: the drippers that have a drip mode, and the infusers that have an infusion mode. FIG. 1A illustrates a generic cone dripper 102 using a Number 2 conical coffee filter 104. To use the cone dripper 102, the cone dripper 102 is placed on top of a coffee cup 106, the conical coffee filter 104 is inserted in the conical container 108, coffee grounds and hot water are then added to the conical coffee filter 104. The coffee brews in the filter paper and the brewed coffee slowly drips through the drainage holes 110 located on the cone dripper base 112. The time it takes for the brewed coffee to complete the dripping is called the drip time. The cone dripper typically has three drainage holes, and the rate of dripping, herein called the drip rate, depends largely on the diameter of the drainage holes. The advantage of the dripper is that it is cheap to produce and easy to use. However, there are several deficiencies of the generic cone dripper:

1) The user has no control of the drip rate;
2) there is no infusion mode, i.e. the time the water and coffee grounds infuse before dripping starts, and
3) The size of the cone dripper is limited by the capacity of the conical filter used.

FIG. 1B illustrates the most common infuser type coffee brewer: the generic French press 114. It has a French press container 116, typically a glass or plastic beaker. A handle 120 is slidingly attached to a French press lid 118. A French press metallic filter 122 is attached to the bottom of the handle.

FIG. 1C illustrates an opened cone filter. FIG. 1D shows the flattened cone filter as sold commercially (typically a number of them are stacked, one on top of the other). FIG. 1E illustrates a basket filter in the shape it is sold commercially (typically a number of them are stacked, one inside the other). FIG. 1F shows the basket filter opened flat as a filter paper disk. FIG. 1G show cross sections of a cone and cylinder with dimensions as shown. Since the volume of a cone is ⅓ the area of the base multiplied by its height, and the volume of a cylinder is the area of the base multiplied by its height, FIG. 1G illustrates that the profile of a cylinder is much smaller than a cone with the same volume. Both cross sections have a volume of approximately 33 cubic inches.

To use the generic French press 114 for brewing coffee, coffee grounds and hot water are added to the French press container 116, and then the French press lid 118 is placed on the top of the French press container with the French press metallic filter 122 in an up position above the coffee grounds and water. The coffee is infused (infusion mode) in the French press container 116, say for 4 minutes. Then the handle 120 is pressed down, with the metallic filter forcing the grounds to the bottom of the container, thereby leaving the brewed coffee above the metallic filter. The brewed coffee, which remains above the metallic filter, is then poured into a cup. Note that the filter is designed so that the coffee grounds remain below the filter as the filter moves down, but the water and brewed coffee remain above the filter.

There are several deficiencies of the generic French press: 1) some coffee grounds typically get in the brewed coffee after pressing is completed; 2) the grounds remaining in the French press container have to be disposed of, and 3) the press time (similar to the drip time of the dripper) gives the user very little control of the process.

There are several proprietary single cup coffee brewers. Five of the most popular are:

a) Clever™ Coffee Brewer (uses a Number 2 conical coffee filter) and its larger version, the NEW Clever Coffee Brewer (uses a Number 4 conical coffee filter). These are covered by U.S. Pat. No. 6,327,965.
b) Incred 'a Brew™ Coffee Maker: Also covered by U.S. Pat. No. 6,327,965. Uses a metal filter.
c) AeroPress™ Coffee Brewer (uses a proprietary filter paper). Covered by U.S. Pat. No. 7,849,784.
d) Bonavita BV4000ID Porcelain Immersion Coffee Dripper. (Uses a Number 4 conical coffee filter). Flow is turned on or off using a lever.
e) Frieling Coffee for One™: Has drip mode only, uses a metal filter The first four proprietary coffee brewers listed above all have an infusion mode, however only the AeroPress uses filter paper with a brewing container has a flat bottom. Furthermore, although the first four proprietary coffee brewers have an infusion mode and a drip mode, none can control the drip rate. The AeroPress proprietary coffee or tea brewer uses proprietary filter paper, comes with nine parts, and is difficult to use.

SUMMARY OF THE DISCLOSURE

A first embodiment of the single cup coffee brewer presented herein has two components: a drip component and a drip rate control component. The drip component has a cylindrical container with a base having drainage holes, and a cylindrical tube that fits inside the cylindrical container with enough clearance so the following is attained. When a sheet of standard Number 4 basket filter paper, when wrapped around the cylindrical tube with the central portion of the filter paper pressed against the cylindrical tube bottom and the bottom of wrapped cylindrical tube placed against the top of the base, the wrapped cylindrical tube fits snugly in the cylindrical container.

The second component is a drip rate control component that is attached to the bottom of the drip component and is used to control the rate of drainage flow (i.e. drip rate) from the drip component. The drip rate control component has a lever that rotates between zero and 90 degrees along an axis perpendicular to the longitudinal axis of the drip component. When the lever is set at zero degrees, no dipping is allowed. When set at 90 degrees, the maximum drip rate occurs. As the lever is positioned between zero and 90 degrees the drip rate is determined by the angle; the greater the angle the greater the drip rate. The drip rate control component is calibrated in this embodiment so that the drip rate in the first embodiment has a drip time that lies between 0 and four minutes.

By appropriate design of the single cup coffee brewer as described in the detailed description, a large number of brewing options are available to a user. For example, the coffee brewer can be used in the following ways: 1) as a dripper with a user setting drip time of four minutes, 2) as an infuser with a user setting infuser time of four minutes followed by dripping with drip time of 30 seconds, or 3) as an infuser with a user setting infusion time of two minutes followed by a user set drip time of two minutes. In all these examples, after dripping is complete, a user can easily dispose of the paper filter containing the coffee grounds.

BRIEF DESCRIPTION OF THE DRAWINGS

FIG. 1A is a prior art generic cone dripper.

FIG. 1B is a prior art generic French press.

FIGS. 1C through 1F illustrate perspective views and commercial packaging views of the cone filter and the basket filter.

FIG. 1G illustrates the profiles of the cone and a cylinder having approximately the same volume.

FIGS. 2A and 2B are front top and front bottom perspective views of a first embodiment of the dripper component of the present invention.

FIGS. 3A and 3B are perspective views of a wrapped tube of the first embodiment and an alternate embodiment of the dripper component of the present invention.

FIG. 3C is a perspective view of an alternate embodiment of the cylindrical tube having a tube top lip.

FIG. 3D shows the cylindrical tub with the tube top lip about to construct a wrapped tube.

FIGS. 4A and 4B are sectional views of FIGS. 3A and 3B respectively.

FIGS. 5A through 5C are sectional views illustrating three possible shapes for the brewing container and cylindrical tube. The three brewing containers are examples having substantially cylindrical shapes.

FIG. 6 illustrates an exploded view of the first embodiment of the drip rate control component of the present invention.

FIG. 7A illustrates a sectional view of a portion of the cylindrical base of the first embodiment of the drip rate control component in an expanded scale.

FIG. 7B illustrates an exploded view of the wedge part of the first embodiment of the drip rate control component of the present invention shown in FIG. 6.

FIG. 7C illustrates a side view of the wedge part of the first embodiment of the drip rate control component of FIG. 6.

FIG. 7d illustrates a perspective view of the curved slot and tick marks of FIG. 6 shown in an expanded scale.

FIGS. 8A and 8B are sectional views of the first embodiment of the drip rate control component in an open and closed position respectively; the sections taken are indicated in FIG. 6.

FIG. 9 illustrates an exploded perspective view of a second embodiment of the drip rate control component of the present invention.

FIG. 10A is a perspective view of the second embodiment of the drip rate control component used with a cylindrical brewing container positioned on a coffee cup.

FIG. 10B is a perspective view of the second embodiment of the drip rate control component used with a cone dripper brewing container positioned on a coffee cup.

FIG. 11 is a cross section of the second embodiment of the drip rate control component when assembled, the cross section indicated in FIG. 9.

FIGS. 12A, 12B and 12C indicate the lever positioned in a 0 degree angle, a 45 degree angle and a 90 degree angle respectively.

FIG. 13 illustrated a detail of FIG. 11, the detail indicated by the circle marked 11.

FIG. 14A illustrates the protuberance and the drainage opening in an expanded scale.

FIG. 14B illustrates an alternate version of the drainage opening, where the slit that forms the drainage opening 353 is replaced by ten small circular holes.

FIG. 15 illustrates an exploded perspective view of a single cup coffee brewer that uses both the dripper component and a drip rate control component.

FIG. 16 illustrates a perspective view of a single cup coffee brewer of FIG. 18 assembled and placed on a coffee cup.

FIG. 17 illustrates a front top exploded view of an alternate embodiment of the current invention.

FIG. 18 illustrates a front bottom exploded view of the alternate embodiment of the current invention.

FIG. 19a illustrates a sectional view of an assembly, when the assembly is assembled to brew coffee.

FIG. 19b Illustrates the wrapped assembly when prepared to use the plunger.

FIG. 19c illustrates the plunger component has been slowly pushed down.

FIG. 19c illustrates the wrapped brewing cup component.

DETAILED DESCRIPTION OF THE DISCLOSURE

In the following detailed description and the appended claims, the term shaped filter refers to filters that are either cone filters shown in FIGS. 1C and 1D or basket filters as shown in FIGS. 1E and 1F. A basket filter is made from a flat circular sheet and can be flattened easily when it is removed from its commercial packaging. The diameter of a basket filter is its diameter when flattened. A drip rate of zero means the container does not drip. The term liquid refers to heated water or the liquid in brewed coffee or tea. Although the embodiments presented in this detailed description refer to coffee, the detailed description applies equally well to tea, where coffee grounds are replaced by tea leaves, flakes or a similar product.

The inventive concept presented herein presents an innovative single cup coffee brewer that is constructed out of two components, a dripper component and a drip rate control component. The dripper component presents a new design for a coffee or tea dripper that is superior to those of the prior art. The drip rate control component provides drip rate control to the design so it can be just like an infusing coffee brewer such as a French press.

Dripper Component

FIG. 2A illustrates an exploded perspective frontal top view of a first embodiment of the dripper component 124. FIG. 2B illustrates an exploded perspective frontal bottom view of the first embodiment. Referring to FIGS. 2A and 2B as shown, the dripper component 124 is constructed out of two parts; a cylindrical tube 126 having a tube bottom rim 132, and a brewing container 129 having a cylindrical shape such that its brewing container cylindrical interior 127 fits over the tube exterior surface 125a of the cylindrical tube 126 with enough clearance to accommodate the wrapped tube 128 as indicated in FIGS. 3A and 4A. Referring to FIG. 2A as shown, brewing container 129 has a brewing container bottom drainage part 138 having drainage holes 142, and a brewing container interior diameter 134 that is slightly larger than the cylindrical tube exterior diameter 136. The cylindrical tube 126 has a tube exterior surface 125*a* and a tube interior surface 125*b*.

FIG. 3A illustrates the wrapped tube 128 constructed by wrapping the cylindrical tube 126 with Number 4 paper filter 130. FIG. 4A illustrates a sectional view of the dripper component 124 obtained by cutting along the line 4-4 shown in FIG. 2A. As shown in FIG. 4A, the wrapped tube 128 sits on a coffee cup 108, and heated water 131 and ground coffee 133 has been added to the wrapped tube 128. Note that the paper filter 130 and the coffee cup 108 are not part of the dripper component 124.

The dipper component parts are sized, configured and constructed such that when the paper filter 130 is wrapped tightly around the tube exterior surface 125*a* and tube bottom rim 132, there is the just the right amount of clearance so that when the cylindrical tube 126 is inserted inside the brewing container 129, the paper filter 130 is held snugly in place.

FIGS. 3A and 4A illustrate the preparation of the dripper component 124 for use. Specifically, to use the dripper component, the user wraps the filter paper around the cylindrical tube 126 forming the wrapped tube 128 which is then placed inside the brewing container 129. The user then adds heated water 131 and ground coffee 133 to the brewing container 129. The brewed coffee 135 then slowly drips through the bottom of the coffee filter, through the drainage holes 142, and into the coffee cup 108, while the paper filter 130 keeps the coffee grounds in the wrapped tube 128. When dripping is complete, the user removes the wrapped tube 128 from the coffee cup 108, and can easily dispose of the paper filter with the coffee grounds into the trash after removing it from the cylindrical tube 126. Any residual coffee grounds remaining on the cylindrical tube 126 can then be removed using a butter knife or spoon. The brewed coffee in the coffee cup 108 is ready for drinking FIGS. 3B and 4B illustrate an alternate embodiment to the dripper component 124. The same parts used in FIGS. 3A and 3B are used in FIGS. 4A and 4B. However a paper filter 130 of a larger size is used. When this filter paper is wrapped around the cylindrical tube 126 forming the wrapped tube 128, the paper filter outer annular ring 146 overhangs the brewing container top rim 137 as shown in FIG. 4B. To create this alternate embodiment, the basket paper filter 127 is centrally positioned on top of the brewing container 129, the cylindrical tube 126 is placed centrally over the basket paper filter 127 and then pushed down, forcing the basket paper filter 127 into the brewing container 129 so that the central portion of the basket paper filter 127 lies snugly against the brewing container bottom drainage part 138. The paper filter outer annular ring 146 is then manually forced to overhang the brewing container top rim 137. The cylindrical tube 126 is then removed, leaving the paper filter 130 fitting snugly inside the brewing container 129 with the paper filter outer annular ring 146 overhanging the brewing container top rim 137 as shown in FIG. 4B.

The size of the filter paper depends on the dimensions of the dripper. Two examples of standard filter papers readily available commercially are: Number 6 filter paper having a flattened diameter of eight inches, and filter papers used by 12 cup commercial coffee brewers having a flattened diameter of nine and one half inches. As an example, if a brewing container 129 has an inside diameter 3 inches and a height of 3¼ inches, then a basket paper filter 127 with diameter of 9½ inches will just fit in the brewing container 129; hence the brewing container 129 can accommodate this size of basket paper filter 127. If the brewing container 129 is slightly smaller, then the 9½ inch basket filter paper can be used with overhang as in FIG. 4B. These dimensions of the brewing container 129 will provide a liquid volume similar to the volume of a number 4 cone filter, but with a much smaller profile as indicated in FIG. 1G.

FIG. 3C illustrates another alternate embodiment of the dripper component 124. In this embodiment, a tube top lip 150 is added to the cylindrical tube 126 as shown in FIG. 3*c*. The tube top lip 150 will facilitate the basket paper filter to overhang the brewing container top rim 137 of the brewing container 129 when installed.

FIG. 3D illustrate another alternate method for creating the wrapped tube as shown in FIG. 4B. The paper filter 130 is placed and centered over the brewing container 129. The cylindrical tube 126 with tube top lip 150 is then placed over the paper filter 130, centering it as shown in the FIG. 3D, and then pushed down, forcing the paper filter 130 down into the brewing container 129 until the paper filter 130 is pressed against the bottom of the brewing container 129. The paper filter 130 will then take the shape as shown in FIG. 4B, with the paper filter outer annular ring 146 forced over the brewing container top rim 137 of the brewing container 129 by the tube top lip 150.

It is noted that if paper filter 130 is available commercially with an already folded shape such as indicated in FIG. 3B, then the cylindrical tube 126 is not required. The basket paper filter 127 may be inserted directly into the brewing container 129. This provides another alternate embodiment that includes the basket paper filter 127 as part of the alternate embodiment, and eliminates the cylindrical tube 126 in this alternate embodiment.

FIGS. 5A through 5C illustrate additional alternate embodiments that are consistent with teachings of the present invention. FIG. 5A shows a cross section indicating regular hollow cylinders used for the cylindrical tube 126 and brewing container 129. This corresponds to the embodiments discussed above. FIGS. 5B and 5C illustrated different designs where the brewing container 129 and the cylindrical tube 126 have a substantially cylindrical shape. Finally, it is noted that in all the embodiments presented herein, a cap may be included to fit over the tops of either the cylindrical tube 126 or the brewing container 129. Further alternate embodiments may be constructed that are consistent with the teachings of the present invention.

Alternate Embodiment

FIG. 17 illustrates a front top exploded view of an alternate embodiment of the current invention. FIG. 18 illustrates a front bottom exploded view of the alternate embodiment of the current invention. Referring to FIGS. 17 and 18, the alternate embodiment is implemented as assembly 408. Assembly 408 is comprised of a brewing cup component 404, an outer container component 406, and a plunger component 402. The brewing cup component 404 has a brewing cup cylindrical part 418 and brewing cup top 419. The brewing cup top 419 screws has external threads 424 that attach to the internal threads 422 of brewing cup cylindrical part 418 so that once it is attached; it forms a watertight brewing cup.

Referring to FIGS. 17 and 18, plunger component 402 has a plunger cap 410 with threads 420 that removably screws into internal threads 422 located in the top interior surface of outer container component 406. A rod 412 is slidingly attached to plunger cap 410. A flexible base 414 is attached to the rod at the bottom end, and a knob 416 is attached to the top end of the rod 412. The plunger component 402 is sized and configured so that the flexible base 414 snugly and smoothly slides inside the surface of the brewing cup component 404. The rod 412 has sufficient length such that when assembled, the flexible base 414 can travel the length of the brewing cup component 404 while the plunger cap 410 is attached to brewing cup cylindrical part 418 (with the brewing cup top 419 removed).

FIG. 19*a* illustrates a sectional view of the assembly 408, when the assembly is assembled to brew coffee. The section is taken as indicated in FIG. 17. The plunger component 402 is kept separate from the remaining assembled components. Ground coffee and water is added and allowed to steep for a short time.

FIG. 19*b* indicates the wrapped assembly 419 when prepared to use the plunger. This step is accomplished by first wrapping the brewing cup component 404 with the filter paper 411 forming a wrapped brewing cup component 407 as illustrated in FIG. 19*d*. The outer container component 406 is then placed over the wrapped brewing cup component 407 and then turned upside down. Then the brewing cup top 321 is unscrewed and the plunger component 402 is attached to the outer container component 406 by screwing the plunger cap 410 into the outer container component 406 with the plunger in the up position.

FIG. 19*c* is similar to FIG. 19*b*; however in this case the plunger component 402 has been slowly pushed down forcing the brewed coffee through the filter paper 411 and through the holes 417, thereby flowing into the coffee cup 413. When the plunger presses against the ground coffee at the bottom of the wrapped inside component 409, the brewing process is complete. The apparatus is then removed from the coffee cup and the coffee is ready for drinking.

Drip Rate Control Component

FIG. 6 illustrates a first drip rate control component 302 according to the teachings of the present invention. As shown, the first drip rate control component 302 comprises a pin 305, an upper drainage part 307 having a drainage lip 308, upper drainage holes 312, a spring 310, a cylindrical base 304, a wedge part 314 constructed out of a ring part 316 and two lower wedge pieces, the left lower wedge piece 318*a* and the right lower wedge piece 318*b* that are attached to the ring part 316, and a lower drainage part 320.

Again referring to FIG. 6, the cylindrical base 304 has the shape of a circular disk that has a curved slot 336 positioned near the outer circumference of the cylindrical base 304, and has a concave up circular depression 306 concentric with the cylindrical base 304. The concave up circular depression 306 has a cylindrical hole 309 centrally located inside and concentric with the concave up circular depression 306.

FIG. 7A illustrated a sectional view of a portion of the cylindrical base 304 in expanded scale produced by cutting along the lines 8*a*-8*a* of FIG. 6 and by the dashed circle indicated by 7*a*. FIG. 7B illustrates an exploded view of the wedge part 314. FIG. 7C illustrates a side view of the wedge part 314. As shown in these three figures, the left lower wedge piece 318*a* and right lower wedge piece 318*b* have the shape of circular arc-shaped wedges that have two opposing tapers. The thickest part of the wedge part 314 has maximum thickness 319*a* at the left side and right side of wedge part 314 as shown. Similarly, the thinnest part of the wedge part 314 has minimum thickness 319*b* at the middle of the wedge part 314 as shown.

Again referring to FIG. 6 as shown, lower drainage part 320 has a lower drainage piece 322 having lower drainage holes 323, a lever 326 attached to the outer rim 328 of lower drainage piece 322 and a left tab 324 attached to outer rim 328 of lower drainage piece 322 opposite the attachment point of where lever 326 is attached. The pin 305 passes through the cylindrical hole 309, and permanently rotationally attaches the upper drainage part 307 to the lower drainage part 320. This allows the lower drainage part 320 to rotate relative to the cylindrical base 304. With this construction, the upper drainage part 307 slides vertically relative to cylindrical base 304 and also slides vertically relative to the lower drainage part 320. The lower drainage part 320 is rotationally connected to the cylindrical base 304.

FIGS. 8A and 8B are sectional views of the first drip rate control component 302; the sections taken along the lines 8*a*-8*a* and 8*b*-8*b* as indicated in FIG. 6. A generic cylindrically shaped brewing container 338 has been added to the drip rate control component. The generic cylindrically shaped brewing container 338 is not part of the first drip rate control component 302. The 8*a*-8*a* section is configured so flow is open to the maximum extent, and the 8*b*-8*b* section is configured so that flow is stopped completely in the first drip rate control component 302.

The lever 326 is shaped as shown in FIG. 6. Referring to FIG. 6, FIG. 8A and FIG. 8B the lever 326 fits through the curved slot 336, and can be moved by a user from 0 to 90 degrees through the slot as the lower drainage part 320 rotates. When positioned at 0 degrees (FIG. 8B) the first drip rate control component 302 is closed and when positioned at 90 degrees (FIG. 8A) the first drip rate control component 302 is completely open. As shown in FIG. 6, indicia in the form of number tick marks 343 located on top of the cylindrical base 304 near the curved slot 336 are used to indicate to the user the relative drip rate of fluid flowing through the first drip rate control component 302 using the tick mark numerals labeled 0 to 10, where 0 indicates the unit is closed preventing fluid flow, and 10 indicating fluid can flow to the maximum extent.

In FIG. 8A, the first drip rate control component 302 is an open position. At that time, the lever 326 is set at the furthest counterclockwise positive (see FIG. 6) corresponding to the tick mark 10. (FIG. 7D illustrates the curved slot 336 and the tick marks 343 in an expanded scale.) In this open position, the upper drainage part 307 is raised by the spring 310, where the left tab 324 and the bottom part of the lever 326 are positioned toward the center of the wedge part 314 at the thinnest part of the left lower wedge pieces 318*a* and the right lower wedge piece 318*b*. Liquid flows through the upper drainage holes 312, through the base drainage holes 313, and through the lower drainage holes 323 located on the lower drainage piece 322.

In FIG. 8B, the lever is positioned so that the first drip rate control component 302 is closed. At that time, the lever 326 is positioned in a furthest clockwise position corresponding to the tick mark 0. The upper drainage part 307 is lowered by the wedge part 314, where the left tab 324 and the bottom of the lever 326 are pushed down by the wedge part 314 at its thickest vertical location. When so positioned, water does not flow through the upper drainage holes 312 since the conical portion of the upper drainage part 307 is pressed firmly against the conical portion of the cylindrical base 304. As discussed, the parts of the first drip rate control component 302 are configured so this system works as described.

FIG. 9 illustrates an exploded perspective view of a second embodiment of the drip rate control component: the second drip rate control component 340. FIG. 11 is a sectional view of the second drip rate control component 340 when assembled; the cross section indicted in FIG. 9 by the lines 11-11. The second drip rate control component 340 is designed to work with a generic coffee brewer such as a generic cylindrically shaped brewing container 338 (see FIG. 10A), a generic cone dripper 338a (see FIG. 10B), or the dripper component 124 of the teachings of the present invention (see FIG. 2A). The second drip rate control component 340 is constructed of a bolt 342, a spring 344, a top circular disk 346 having a top circular hole 354 concentric with the top circular disk 346, a curved slot 336 with tick marks 343 and a drainage opening 353 shaped as a curved slit. (The curved slot 336 and tick marks 343 are the same as shown in FIG. 7S). Also included is a drip rate control bottom part 356 having a bottom circular hole 358, and a cutout 360 in one corner as shown. A lever 326 is attached to drip rate control bottom part 356 at the opposite end of the cutout 360. The top circular disk 346 is concave up. It has a curved cross section as shown in FIG. 11 constructed so that liquid will flow towards the drainage opening 353. The drip rate control bottom part 356 is constructed so that when assembled as indicated in FIG. 11, the drip rate control bottom part 356 will rotate around the bottom circular hole 358 in a manner that controls the drip rate. The second drip rate control component 340 is configured so that the lever 326 fits through the curved slot 336. Although not shown in FIG. 9 and FIG. 11, a brewing container 129 may be attached to second drip rate control component 340, either permanently, or removably by threads or other means.

FIG. 10A is an exploded perspective view of a generic cylindrically shaped brewing container 338 about to be attached to second drip rate control component 340 positioned above a coffee cup 108. FIG. 10B illustrates a generic cone dripper 338a having a cone shape, as used in commercial cone drippers. For the generic cone dripper 338a, the second drip rate control component 340 is changed to a modified second drip rate control component 340a. This modification has the drainage opening 353 placed in the center of the drip rate control component, and the bolt 342 is moved off-center so the lever 326 can pivot to control the drip rate.

The spring 344 of second drip rate control component 340 serves two purposes. In normal use, it keeps the drip rate control bottom part 356 pressed against the top circular disk 346. When cleaning the coffee brewer, it allows the drip rate control bottom part 356 to be pulled away from the top circular disk 346 for cleaning.

Referring to FIG. 12A, FIG. 12B and FIG. 12C, as the lever 326 is moved in increments the drainage opening 353 and cutout 360 allow the drip rate to vary. For a specific container, the container, drainage opening 353 and drip rate control bottom part 356 are configured so that it has a drip time between 0 and a maximum time depending upon the position of the lever 326. Hence the second drip rate control component 340 provides the container with drip rate control. The actual drip rate of course depends on many factors, including but not limited to the amount of liquid to be dripped, the coarseness of the grounds, and the temperature of the liquid. In a commercial product maximum drip time will typically be set at four to eight minutes, with the drip rate empirically set to achieve this goal, FIG. 13 illustrates in expanded scale a detail of FIG. 11 showing a protuberance 355 located on the bottom portion of the drainage opening 353. The protuberance 355 is a raised ring that is constructed to allow the bottom part to move smoothly over the drainage opening 353. The protuberance is also shown in FIGS. 12A through 12C.

FIG. 14A illustrates a top view of the protuberance 355 and the drainage opening 353 in an expanded scale. FIG. 14B illustrates an alternate version of the drainage opening 353, where the curved slit that forms the drainage opening 353 is replaced by ten uniformly spaced drainage holes 353a. Each drainage hole corresponds to a tick on the top circular disk.

In alternate embodiments of the second drip rate control component 340, there may be more than one drainage opening 353 and cutout 360, and different designs for the drainage opening 353 implementations.

Single Cup Coffee Brewer: Integrating the Dripper Component and the Drip Rate Control Component FIG. 15 illustrates an exploded perspective cutout view of a single cup coffee brewer 362 that integrates the brewing container 129 with the second drip rate control component 340. The cylindrical tube 126 is ready to install paper filter 130 (not part of the invention). FIG. 16 illustrates a perspective cutout view of a single cup coffee brewer 362 assembled and installed on a coffee cup 108 with the paper filter 130 installed.

The Single Cup Coffee Brewer described above is superior to the previously discussed prior art in that it provides the following advantages and features:
  It uses a standard paper filter. Depending on the amount of brewed coffee desired, it can be configured to accommodate Number 4 paper filter (8 inch flat diameter) or 12 cup commercial paper filter (9½ flat diameter) or other sizes.
  It is easy to dispose of the coffee grounds as compared to coffee brewers that use metal filters
  The cylindrical shape of the container with a flat bottom assures even dripping as compared to those devices that use cone filters.
  The single cup coffee brewer presented herein has drip rate control capability, not available in other prior art single cup brewers discussed above.
  The profile of the single cup coffee brewer is smaller than the cone based coffee brewers with the same liquid capacity By combining the dripper component 124 and the second drip rate control component 340 as indicated in FIG. 16, a large number of brewing options are available to a user. To give three simple examples, the coffee brewer can be used:
  1) as a dripper with a user setting the drip time at four minutes;
  2) as an infuser with an infuser time set to four minutes followed by dripping with drip time of 30 seconds; or
  3) as an infuser with an infusion time of two minutes followed by dripping with a drip time set to two minutes. In all these examples, after dripping is complete, the paper filter containing the coffee grounds are easily disposed of.

It will be obvious to those skilled in the art that other embodiments of a single cup coffee brewer using different dripper and drip rate control components are consistent with the teachings of the present invention. For example, the perforated bottom of the brewing container may be replaced by any mechanism that in practice will allow the wrapped tube 128 in which the bottom of the filter paper is allowed to fit snugly against the bottom of the container and will allow the brewed coffee to drain through, such as a metal or plastic screen.

Instead of using standard filter paper, the filter paper may be customized by having indicia on it to enable the centering the paper filter 130 on the cylindrical tube 126 as shown in FIG. 3D. Additional indicia may be used on the filter paper to indicate the amount of coffee grounds and the amount of water added to the installed filter paper. Concentric circles with appropriate markings on the filter paper is one way of implementing this. Of course, the indicia must be the type that would not affect the brewing coffee.

DISCUSSION

In the previous description and figures, the wrapped tube 128 appears to be wrapped neatly. In practice any wrapping in which the bottom of the filter paper is allowed to fit snugly against the brewing container bottom drainage part 138 will work.

Temperature control is an important part of controlling the brewing process. It is noted that the single cup coffee brewer introduced here has a cylindrical tube and a brewing container with filter paper positioned in between the two; these three barriers create an insulation effect. Most other commercially available single cup brewers have only a single barrier.

Although the detailed description section of this application refers mainly to coffee applications, it applies equally well to tea and other brewed products. Also, additional enhancements may occur to those skilled in the art. For example, a cap could be added to provide enhanced temperature control. Other additions to the cap may include a thermometer with a probe, and a timer. Also, the brewing container may be constructed to have insulation or a vacuum barrier.

The disclosure presented herein gives multiple embodiments of the present invention. These embodiments are to be considered as only illustrative of the invention and not a limitation of the scope of the present invention. Various permutations, combinations, variations, and extensions of these embodiments are considered to fall within the scope of this invention.

What is claimed is:

1. A coffee or tea brewer comprised of:
   a brewing container having a container drainage part positioned at bottom of said brewing container, said container drainage part configured to drain liquid stored in said brewing container when a shaped filter is installed in said brewing container such that bottom of said shaped filter is positioned against bottom of said container drainage part;
   a drip rate control component having a plurality of drip rates, said drip rate control component being attached to said brewing container, said drip rate control component configured to control said drip rate of liquid drained from said brewing container for at least three distinct drip rates including a drip rate of zero when said shaped filter is installed in said brewing container such that bottom of said shaped filter is positioned against bottom of said container drainage part;
   an upper drainage part having at least one upper drainage hole;
   said upper drainage part having a cylindrical base;
   a lower drainage part having at least one lower drainage hole
   wherein said upper drainage part is vertically sideingly connected and positioned above said cylindrical base, said cylindrical base is vertically sideingly connected to said lower drainage part, and said lower drainage part is rotationally connected to said cylindrical base;
   said lower drainage part having at least three distinct rotational positions relative to said cylindrical base;
   said drip rate control component being configured such that when said lower drainage part is positioned in a first rotational position, then drip rate has a first positive value;
   when said lower drainage part is positioned in a second rotational position, then said drip rate has a second positive value less than the drip rate of said first rotational position; and
   when said lower drainage part is positioned in a third rotational position, then said drip rate has a zero value.

2. The coffee or tea brewer of claim 1 further comprised of:
   a spring;
   a pin;
   a curved slot positioned on said cylindrical base;
   a lever attached to outer rim of said lower drainage part;
   a wedge part having a shape of a circular ring such that that thickness of said wedge part has two opposing tapers from a minimum thickness to a maximum thickness
   wherein said drip rate control component is constructed such that said pin passes through said upper drainage part, then passes through said spring, then passes through said cylindrical base, then passes through said wedge part, then is attached to said lower drainage part;
   said lever passes from said lower drainage part through said curved slot and then away from said pin on said upper drainage part such that when said lever is positioned at a curved slot first end of said curved slot, then said spring forces said cylindrical base against said wedge part at its thinnest part thereby covering all of said at least one base drainage hole thereby having a zero drip rate;
   when said lever is positioned in a curved slot second end of said curved slot, then said spring forces said cylindrical base against said wedge part at its thickest part, thereby opening said at least one base drainage hole so that it has maximum drip rate; and
   when said lever is positioned in between said curved slot first end and said curved slot second end, then said spring forces said cylindrical base against said wedge part at a position between its thickest part and its thinness part, thereby opening said at least one base drainage hole so that it has a positive drip rate that is less than said maximum drip rate.

3. The coffee or tea brewer of claim 2 further comprised of:
   at least three tick marks on said cylindrical base positioned near said curved slot such that each tick mark corresponds to a distinct lever position, and said lever position corresponds to a distinct rotational position such that when the lever is in a first lever position, then said lower drainage part is in said first rotational position, when the lever is in a second lever position, said lower drainage part is in said second rotational position, and when the lever is in a third lever position, said lower drainage part is in said third rotational position.

4. A coffee or tea brewer comprised of:
   a brewing container having a container drainage part positioned at bottom of said brewing container, said container drainage part configured to drain liquid stored in said brewing container when a shaped filter is installed in said brewing container such that bottom of said shaped filter is positioned against bottom of said container drainage part;
   a drip rate control component having a plurality of drip rates, said drip rate control component being attached to said brewing container, said drip rate control component configured to control said drip rate of liquid drained from said brewing container for at least three distinct drip rates including a drip rate of zero when said shaped filter is installed in said brewing container such that bottom of said shaped filter is positioned against bottom of said container drainage part wherein said drip rate control component is comprised of:

a drip rate control top part attached to said brewing container;

a drip rate control bottom part, said drip rate control bottom part being rotationally connected to said drip rate control top part such that there exist at least three rotational positions of said drip rate control bottom part relative to said drip rate control top part that controls drip rate and wherein when said drip rate control bottom part is positioned in a first rotational position, then said drip rate control bottom part is positioned such that that said drip rate in said brewing container is zero, and when said drip rate control bottom part is positioned at a second rotational position and a third rotational position respectively, then said drip rate of said second rotational position covers said at least one drainage opening such that said drip rate of said second rotational position is positive and is less than said drip rate of said third rotational position;

said drip rate control bottom part being further comprised of a drainage mechanism comprised of a lever attached to said drip rate control bottom part; and a wedge part, said wedge part comprised of at least two opposing tapers attached to said drip rate control bottom part wherein thickness of each of said at least two opposing tapers varies from a minimum thickness to a maximum thickness; said drainage mechanism adapted so that when said lever is positioned in said first rotational position, then said drip rate control bottom part is adapted to interface with said wedge part at its thinnest part causing a zero drip rate;

when said lever is positioned at said second rotational position, then said drip rate control bottom part is adapted to interface with said wedge part at its thickest part causing maximum drip rate; and when said lever is positioned at a position between thickest part and thinness part of said wedge part, then said drip rate control bottom part is adapted to interface with said wedge part causing said drip rate to be between but not including said zero drip rate and said maximum drip rate.

5. A coffee or tea brewer comprised of:

a brewing container having a container drainage part positioned at bottom of said brewing container, said container drainage part configured to drain liquid stored in said brewing container when a shaped filter is installed in said brewing container such that bottom of said shaped filter is positioned against bottom of said container drainage part;

a drip rate control component having a plurality of drip rates, said drip rate control component being attached to said brewing container, said drip rate control component configured to control said drip rate of liquid drained from said brewing container for at least three distinct drip rates including a drip rate of zero when said shaped filter is installed in said brewing container such that bottom of said shaped filter is positioned against bottom of said container drainage part;

said brewing container has a first substantially cylindrical shape;

said brewing container additionally comprised of a cylindrical tube having a second substantially cylindrical shape, an exterior surface, an interior surface and a tube bottom rim, said cylindrical tube being configured in such a way that if a wrapped tube is constructed by wrapping a basket paper filter substantially uniformly around said cylindrical tube such that said basket paper filter fits snugly against said exterior surface of said cylindrical tube, then said wrapped tube is insertable in said brewing container such that said tube bottom rim of said wrapped tube is positioned snugly against said brewing container flat bottom;

said coffee or tea brewer additionally comprising a plunger component, said plunger component having a flexible base, said flexible base fitting snugly, slidingly and removably in interior of said cylindrical tube, said plunger component adapted such that said wrapped tube is constructed by wrapping said basket paper filter substantially uniformly around said cylindrical tube such that said basket paper filter fits snugly against said exterior surface of said cylindrical tube, then said wrapped tube is insertable in said brewing container such that said tube bottom rim of said wrapped tube is positioned snugly against said brewing container bottom and if liquid is added to cylindrical tub interior, and said plunger component is inserted in said cylindrical tube and pushed down so that said flexible base pushed down on said liquid, then said liquid is pushed through bottom of said basket paper filter.

6. The coffee or tea brewer of claim 5 wherein said plunger component is further comprised of a rod, a plunger cap and a knob, said rod is attached to said flexible base at a first end of said rod, said knob is attached to said rod at a second end of said rod and said plunger cap is snuggly and slidingly attached to said rod between said flexible base and said knob such that when said flexible base is inserted at top of said cylindrical tube and said plunger cap is attached to said cylindrical tube and said knob is pushed toward said tube bottom rim, then said flexible base snugly and slidingly is pushed toward said tube bottom rim of said cylindrical tube.

\* \* \* \* \*